US012044282B2

(12) United States Patent
Stark et al.

(10) Patent No.: US 12,044,282 B2
(45) Date of Patent: Jul. 23, 2024

(54) POWERTRAIN MOUNT WITH INTEGRATED TUNED MASS DAMPER

(71) Applicant: FORD GLOBAL TECHNOLOGIES, LLC, Dearborn, MI (US)

(72) Inventors: Kevin Stark, Windsor (CA); Lin Zhu, Canton, MI (US); Vijaya Kumar Ambarisha, Novi, MI (US); Matthew David Shaw, Canton, MI (US); Bhavin Patel, Cupertino, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 61 days.

(21) Appl. No.: 17/721,324

(22) Filed: Apr. 14, 2022

(65) Prior Publication Data

US 2023/0332661 A1 Oct. 19, 2023

(51) Int. Cl.
*F16F 7/108* (2006.01)
*B60K 1/00* (2006.01)
*B60K 5/12* (2006.01)

(52) U.S. Cl.
CPC ............ *F16F 7/108* (2013.01); *B60K 1/00* (2013.01); *B60K 5/1208* (2013.01)

(58) Field of Classification Search
CPC ...... F16F 7/108; F16F 7/00; F16F 7/10; F16F 7/104; B60K 1/00; B60K 5/00; B60K 5/12; B60K 5/1208; B60K 5/1283; B60K 5/1291
See application file for complete search history.

(56) References Cited

U.S. PATENT DOCUMENTS

| | | | | |
|---|---|---|---|---|
| 5,927,678 A | * | 7/1999 | Parr | F16F 7/1022 74/89.1 |
| 6,799,754 B1 | * | 10/2004 | Bodie | F16F 13/107 267/140.14 |
| 7,600,601 B2 | | 10/2009 | Lin et al. | |
| 9,267,567 B2 | * | 2/2016 | Mathai | F16F 9/10 |
| 9,931,923 B2 | * | 4/2018 | Oki | B60K 5/1208 |
| 9,933,039 B2 | | 4/2018 | Werner et al. | |
| 9,987,915 B1 | * | 6/2018 | Yoon | B60K 5/1291 |
| 10,537,059 B2 | * | 1/2020 | Muellenbach | A01D 34/62 |
| 10,576,813 B2 | | 3/2020 | Avina Flores et al. | |
| 10,663,028 B2 | * | 5/2020 | Robinson | B62D 24/02 |
| 10,899,216 B2 | | 1/2021 | Kim | |
| 11,230,178 B2 | * | 1/2022 | Kim | B60K 5/1283 |
| 11,358,460 B2 | * | 6/2022 | Kim | B60K 5/1283 |
| 11,376,970 B2 | * | 7/2022 | Yu | B60K 17/04 |

(Continued)

*Primary Examiner* — James M Dolak
(74) *Attorney, Agent, or Firm* — Vincent Mastrogiacomo; Brooks Kushman P.C.

(57) ABSTRACT

A method is disclosed for providing a tuned mass damper for a powertrain component. The method includes the steps of providing a mount adapted to be attached to the powertrain component; assembling a mass element to the mount; and molding an elastomeric body around the mass element to bond the mass element to the mount. The tuned mass damper assembly for a drivetrain component is also disclosed that may be attached to a mount having an opening that extends through the mount or a housing portion provided on the mount The molded elastomeric body integrally attaches the mass element to the mount. Alternatively, the tuned mass assembly may be bonded to a plate that is attached to a motor retention element.

5 Claims, 6 Drawing Sheets

(56) References Cited

U.S. PATENT DOCUMENTS

| | | | |
|---|---|---|---|
| 11,841,059 B2* | 12/2023 | Dwyer | F16F 13/262 |
| 11,884,327 B2* | 1/2024 | Janarthanam | B60L 50/66 |
| 11,892,050 B2* | 2/2024 | Maeda | B60K 5/1208 |
| 11,905,850 B2* | 2/2024 | Hartung | F16F 7/10 |
| 11,906,012 B2* | 2/2024 | Kim | F16F 13/1481 |
| 11,912,118 B2* | 2/2024 | Schantl | B60K 1/00 |
| 11,926,216 B2* | 3/2024 | Oki | F16F 15/08 |
| 11,927,237 B2* | 3/2024 | Kondo | F16F 13/108 |

\* cited by examiner

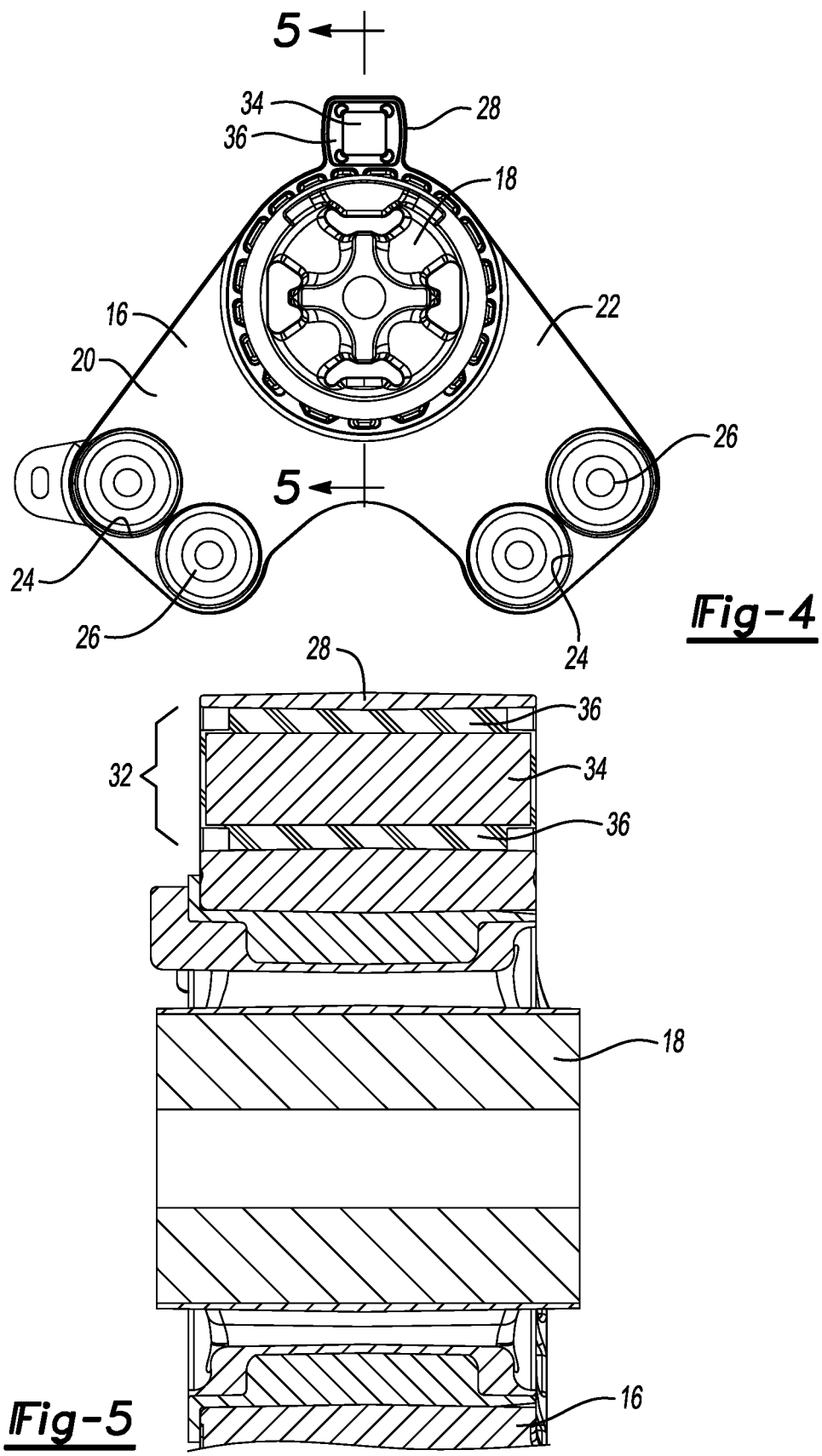

POWERTRAIN MOUNT WITH INTEGRATED TUNED MASS DAMPER

TECHNICAL FIELD

This disclosure is directed to several embodiments of a mount for a drivetrain assembly such as an e-machine, internal combustion engine, or transmission.

BACKGROUND

Battery electric vehicles (BEV), hybrid electric vehicles (HEV), and vehicles with internal combustion engines (ICE) each include drivetrain components that function to provide torque for propelling the vehicle. Drivetrain components, such as an e-machine, an internal combustion engine or a transmission, are connected to the vehicle chassis via a mounting assembly or mount that is connected to the frame, or a crossbar connected to the frame.

As the drivetrain components operate, vibrations from the drive unit can be transmitted or amplified due to the physical characteristics of the mount assembly. This may result in noise, vibration, and harshness (NVH) issues for the vehicle, including vibration of the vehicle steering wheel and floor pan. Mount displacement may also contribute to structure-borne noise at resonance frequencies that contribute to the sound pressure level in the passenger compartment, and may also affect shift quality, ride comfort, and other NVH phenomena.

Tuned mass dampers (TMD) are devices utilized to control NVH problems caused by vehicle drivetrain components. Known TMDs are external, separate assemblies attached to mounts that are affixed with fasteners. Assembling separate TMD devices adds manufacturing steps to assembly of the vehicle.

Such devices require space and may be difficult to fit in the limited space available in the areas where drivetrain components are disposed in a vehicle. Locating the TMD device in an optimal location to reduce vibrations allows for the minimization of the mass of the TMD that is important for reducing vehicle weight.

This disclosure is directed to solving the above problems and other problems as summarized below.

SUMMARY

According to an aspect of this disclosure, a method is disclosed for providing a tuned mass damper for a powertrain component. The method comprises the steps of providing a mount adapted to be attached to a wall of the powertrain component, assembling a mass element to the wall, and molding an elastomeric body around the mass element and to the wall to bond the mass element to the wall.

According to other aspects of the disclosed method the mount may define an opening, and the step of molding the elastomeric body includes molding the elastomeric body to the inner surface of the opening. Alternatively, the tuned mass damper assembly may be separately molded and pressed into the opening. The opening extends through the mount, and the step of molding the elastomeric body may include molding the elastomeric body to the inner surface of the opening. In yet another embodiment, the method may comprise that the wall may be a planar wall of the mount that is concentric with a central axis of a motor attached to the mount, and wherein the step of molding the elastomeric body includes bonding the elastomeric body to the planar wall.

According to another aspect of this disclosure, a tuned mass damper assembly is disclosed for a drivetrain component attached to a vehicle frame. The tuned mass damper assembly comprises a mount defining an opening at a predetermined location on the mount that is attached to the vehicle frame. A molded elastomeric body having a selected stiffness integrally attaches the mass element to the opening that is tuned to damp a predetermined vibration.

According to other aspects of the tuned mass damper assembly for a drivetrain component, the opening may include a sidewall with the molded elastomeric body (e.g., a rubber body) being attached to the sidewall. The drivetrain component may be an e-machine, and the mount may be a pendulum mount that attaches the e-machine to an over-hanging cross-bar attached to the vehicle frame. Alternatively, the drivetrain component may be an internal combustion engine, and the mount may be an engine mount that attaches the internal combustion engine to the vehicle frame.

The tuned mass damper assembly for a drivetrain component may include an opening defined by a TMD housing portion of the mount having a plurality of sidewalls. The molded elastomeric body integrally attaches the mass element to the plurality of sidewalls of the TMD housing portion. The tuned mass damper assembly housing portion may be integrally formed as part of the mount. The TMD housing portion may define a polygonal, a cylindrical opening, or other opening.

The tuned mass damper assembly for a drivetrain component such as an e-machine, may include a TMD housing portion integrally formed on a periphery of a pendulum mount as part of the pendulum mount. If the drivetrain component is an internal combustion engine, the mount may be an engine mount that attaches the internal combustion engine to the vehicle frame.

According to yet another aspect of this disclosure, a tuned mass damper assembly is disclosed for a drivetrain component attached to a vehicle frame. The tuned mass damper assembly includes a mount, a molded elastomeric body and a mass element tuned to damp a vibration. The mount attaches the drivetrain component to the vehicle frame and includes a snubbing plate adapted to be attached to a mounting plate of the drivetrain component, wherein the mounting plate defines a threaded opening that is adapted to receive a fastener having a central axis, and wherein the mount is centered relative to the central axis of the fastener. The molded elastomeric body has a selected degree of resiliency. The mass element may be a circular body defining a hole that is centered relative to the central axis of the fastener. The mass, stiffness and shape of the tuned mass damper assembly are chosen to damp a predetermined vibration, and the molded elastomeric body integrally attaches the mass element between the snubbing plate and the mounting plate. The TDM can be tuned different frequency in X, Y, Z directions depending upon what resonance frequency needs to be dampened. The shape of TMD, weight of mass rubber hardness, and rubber thickness will change the tuning frequency.

According to other aspects of the tuned mass damper assembly for a drivetrain component attached to a vehicle frame, the mounting plate may include a planar wall. The molded elastomeric body bonds the mass element to the planar wall. The drivetrain component may be an e-machine, and the mount may be a pendulum mount that attaches the e-machine to an over-hanging cross-bar attached to the vehicle frame.

The above aspects of this disclosure and other aspects will be described below with reference to the attached drawings.

BRIEF DESCRIPTION OF THE DRAWINGS

FIG. 4 is a side elevation view of the pendulum mount shown in FIG. 2.

FIG. 5 is a cross-section view taken along the line 5-5 in FIG. 4.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
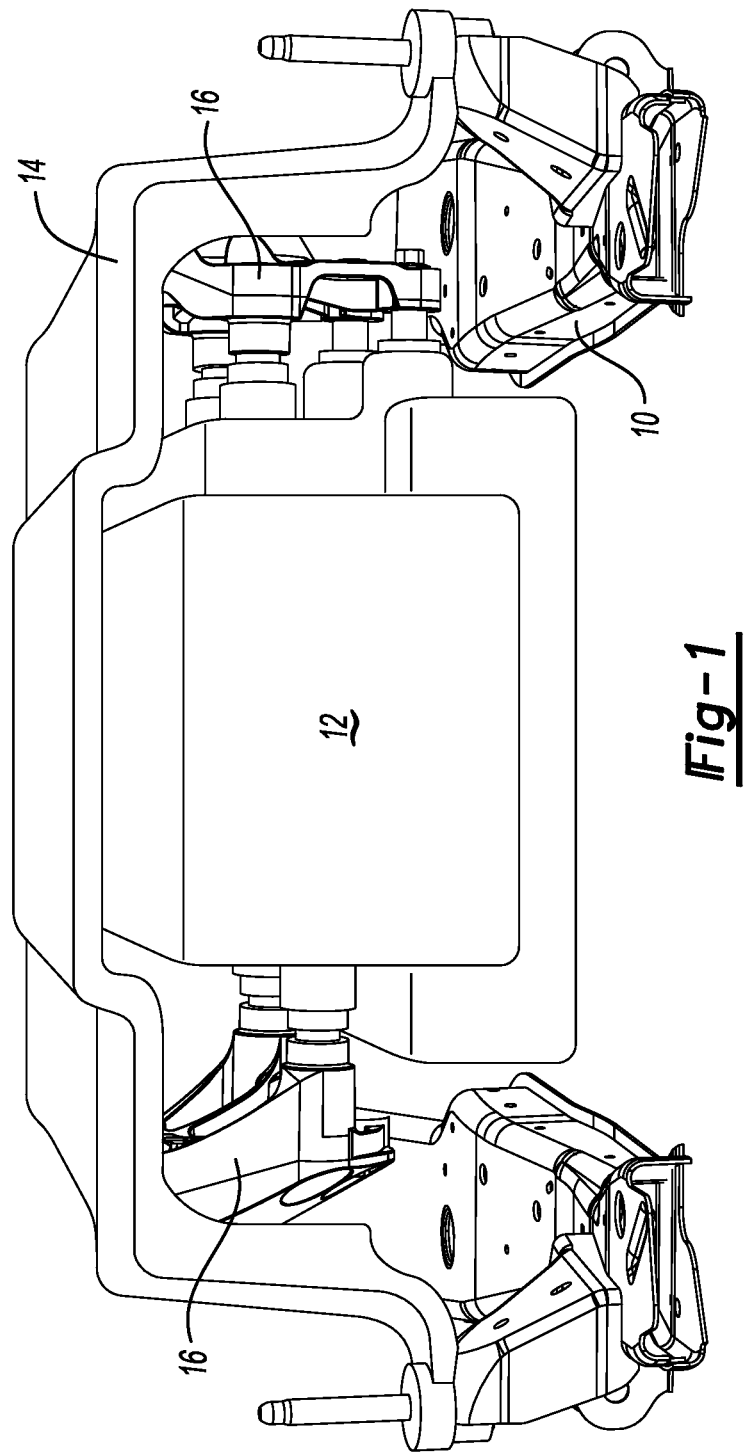
FIG. 1 is an elevation view of an e-machine supported by a set of pendulum mounts from a crossbar that is attached to the frame of a vehicle.
Figure 2:
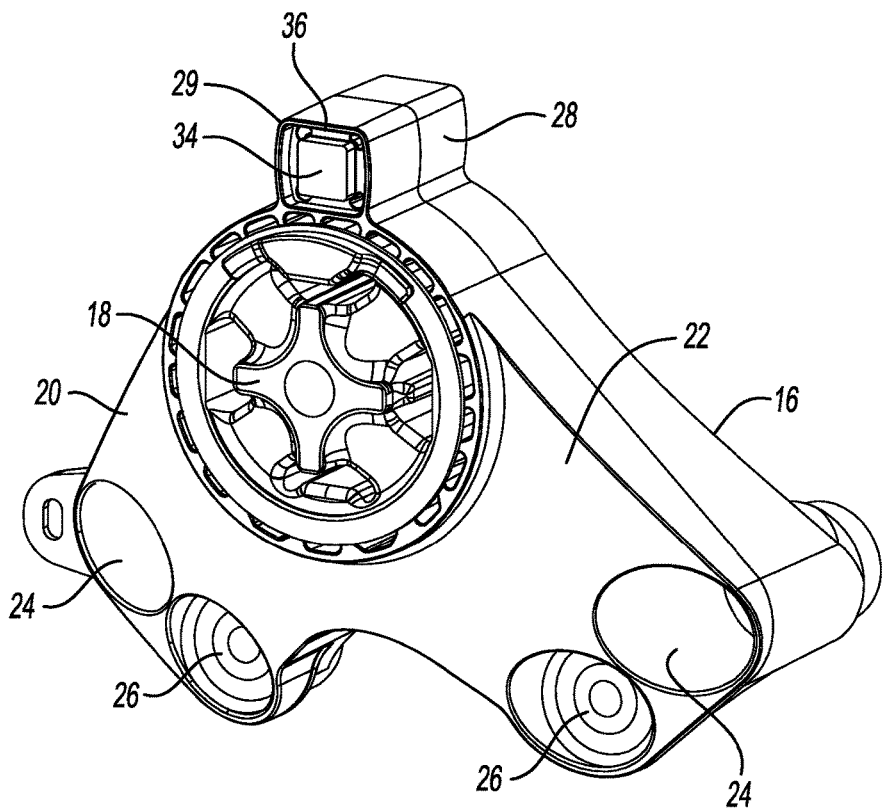
FIG. 2 is a perspective view of a pendulum mount that includes a housing portion defining a polygonal opening on a top area of the mount that receives a mass damper element that is integrally attached to the housing portion by an elastomeric body.
Figure 3:
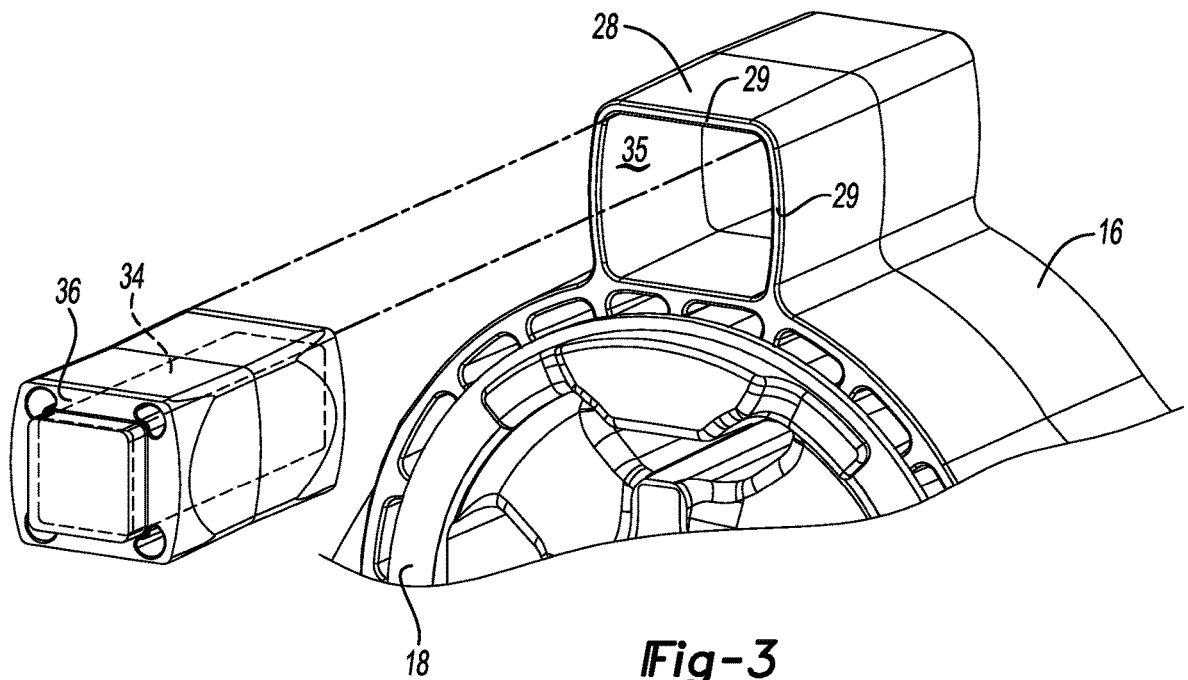
FIG. 3 is a fragmentary perspective view of the pendulum mount shown in FIG. 2 with the mass damper and the molded elastomeric elements exploded away from the housing portion.

Referring to FIG. 1, a vehicle frame 10 is partially illustrated for a vehicle having an e-machine 12 that is used to propel the vehicle. The e-machine 12 is suspended from a crossbar 14 that is attached to the vehicle frame 10 by a pair of pendulum mounts 16.

Referring to FIGS. 2-5, one embodiment of a pendulum mount 16 is illustrated that includes a main rubber element (MRE) 18 that is aligned with the central axis of the e-machine 12 (shown in FIG. 1). The pendulum mounts 16 are stamped or cast members that include first and second arms 20, 22 that extend radially outwardly from the MRE 18 to fastener boss receptacles 24. The fastener boss receptacles 24 are adapted to receive fastener bosses 26 that in turn receive fasteners that are secured to the e-machine 12.

A TMD housing portion 28 includes sidewalls 29 that may be integrally formed as part of the pendulum mount 16 above the MRE 18. The sidewalls 29 of the TMD housing portion 28 defines a polygonal opening 30 that receives a tuned mass damper assembly 32. The tuned mass damper assembly 32 includes a mass element 34 that is encased in an elastomeric body 36.

The method of assembling the tuned mass damper assembly 32 inside the opening 30 is performed by assembling the mass element 34 inside the opening 30 and then integrally molding the elastomeric body 36 about the periphery of the mass element 34 and to the inner surface 35 of the TMD housing portion 28. The elastomeric body 36 may be formed of natural rubber or a synthetic rubber compound having a predetermined degree of resiliency. The mass element may be formed of steel or another metal or metal alloy. The tuned mass damper assembly 32 has a mass that is calibrated to damp vibrations and minimize resonance frequencies generated by the powertrain due to modal alignment. The tuned mass damper assembly 32 is directly bonded to the opening 30 in the TMD housing portion 28 of the pendulum mount 16 or may be pressed into the housing portion 28.

Figure 6:
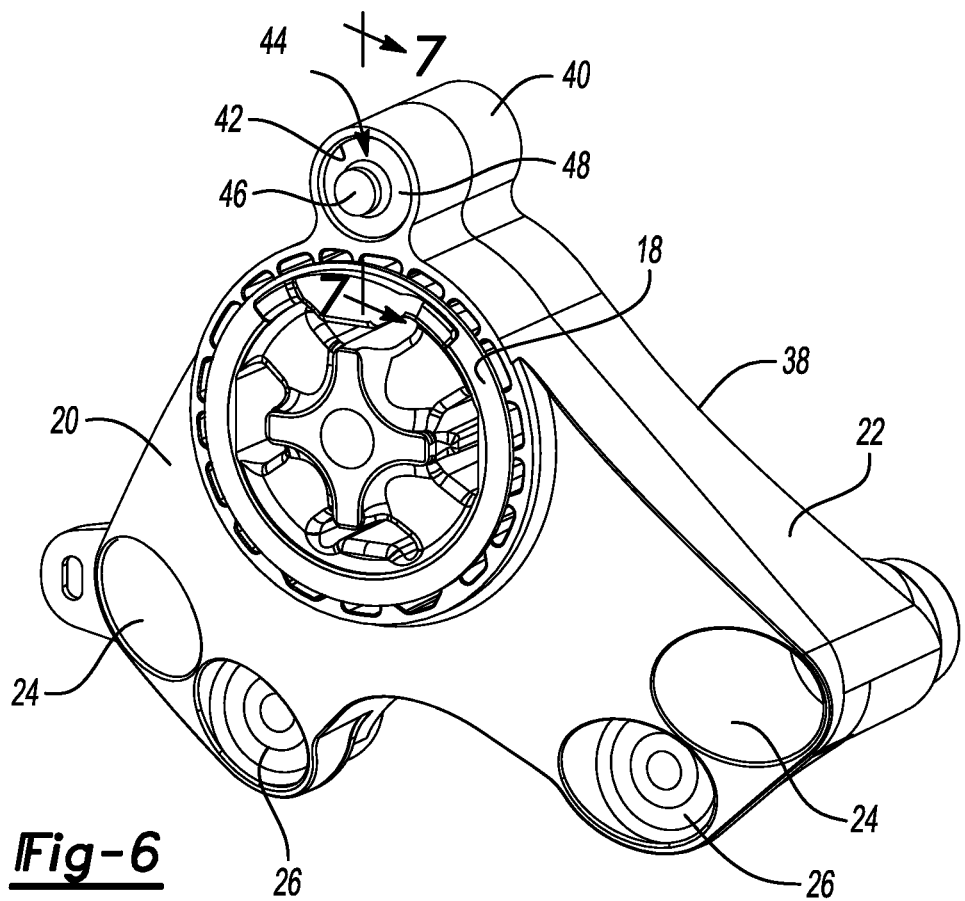
FIG. 6 is a perspective view of another embodiment of a pendulum mount that includes a TMD housing portion defining a cylindrical opening on a top area of the mount.
Figure 7:
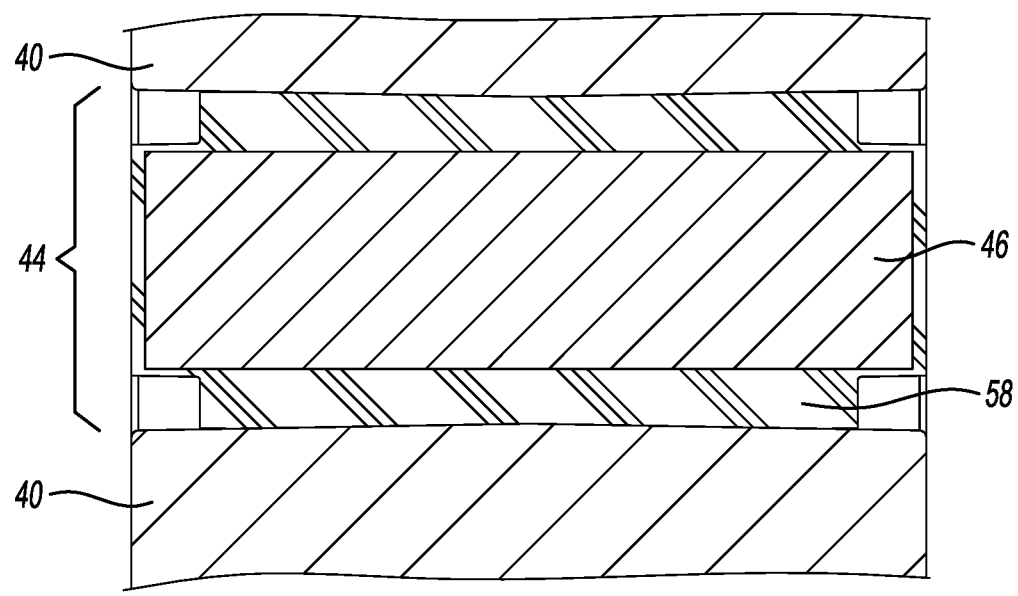
FIG. 7 is a cross-section view taken along the line 7-7 in FIG. 6.

Referring to FIGS. 6 and 7, an alternative embodiment of a pendulum mount 38 is illustrated that is similar to the embodiment of FIGS. 2-5 and the same reference numerals will be used to identify corresponding parts. The pendulum mount 38 includes the motor retention element (MRE) 18 that is aligned with the central axis of the e-machine 12 (shown in FIG. 1). The pendulum mounts 38 include first and second arms 20, 22 that extend radially outwardly from the main rubber element (MRE) 18 to fastener boss receptacles 24. The fastener boss receptacles 24 are adapted to receive fastener bosses 26 that receive fasteners that are secured to the e-machine 12.

A cylindrical housing portion 40 may be integrally formed as part of the pendulum mount 38 above the MRE 18. The cylindrical housing portion 40 defines a cylindrical opening 42 that receives the cylindrical tuned mass damper assembly 44. The tuned mass damper assembly 44 includes a cylindrical mass element 46 that is encased in the cylindrical elastomeric body 48.

The method of assembling the tuned mass damper assembly 44 inside the cylindrical housing portion 40 follows essentially the same steps as the method described with reference to the embodiment of FIGS. 2-5 and for brevity will not be repeated.

Figure 8:
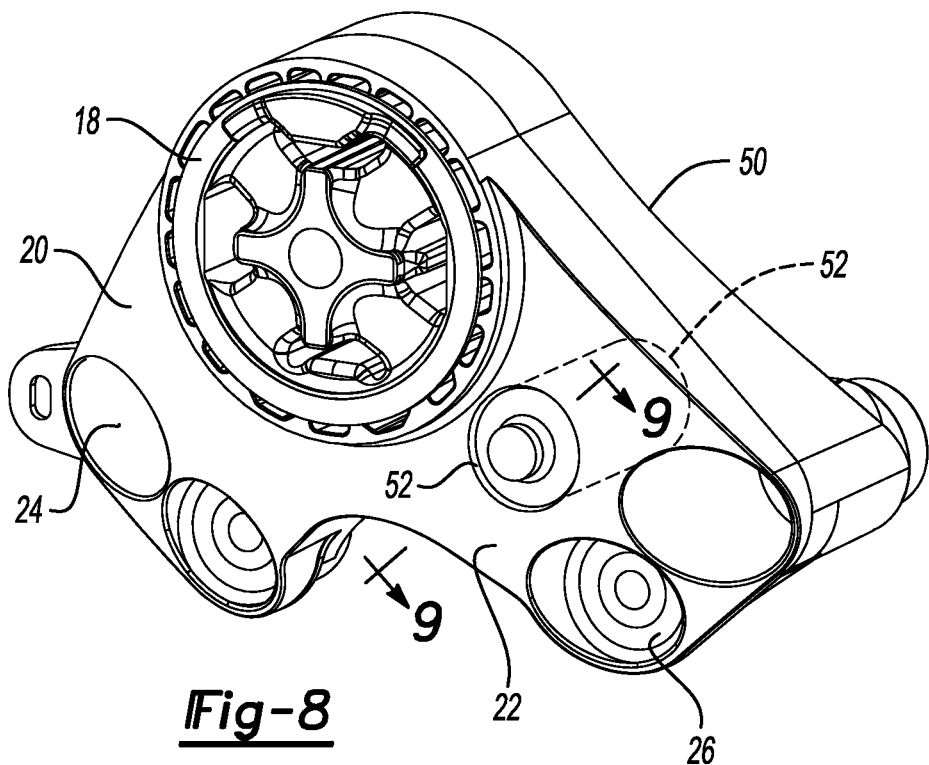
FIG. 8 is a perspective view of another embodiment of a pendulum mount that includes an opening defined on a wall of the mount that receives a mass damper element integrally attached to the opening by a molded elastomeric body.
Figure 9:
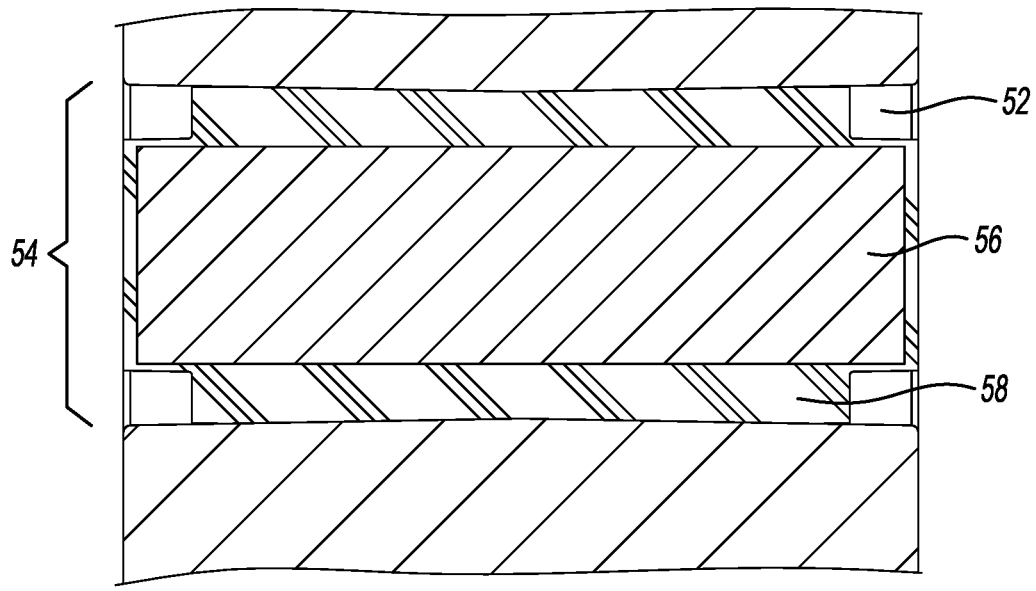
FIG. 9 is a cross-section view taken along the line 9-9 in FIG. 8.

Referring to FIGS. 8 and 9, an embodiment of a pendulum mount 50 that requires less space than the previous embodiments is disclosed that does not require the housing portions 28 or 40. The same reference numerals will be used to identify corresponding parts to those of the previous embodiments. The pendulum mount 50 includes the main rubber element (MRE) 18 that is aligned with the central axis of the e-machine 12 (shown in FIG. 1). The pendulum mounts 50 include first and second arms 20, 22 that extend radially outwardly from the MRE 18 to fastener boss receptacles 24. The fastener boss receptacles 24 are adapted to receive fastener bosses 26 that receive fasteners that are secured to the e-machine 12.

An opening 52 is defined by the second arm 22 of the mount 50. The opening 52 as shown is cylindrical in shape but it should be understood that the opening 52 could be formed in another shape such as a polygonal or irregular shape to reduce the space requirements to a greater extent. The opening 50 receives the cylindrical tuned mass damper assembly 54. The tuned mass damper assembly 54 includes a cylindrical mass element 56 that is encased in the cylindrical elastomeric body 58.

The method of assembling the tuned mass damper assembly 54 inside the opening 52 is performed by assembling the mass element 56 inside the opening 52 and then integrally molding the elastomeric body 58 about the periphery of the mass element 56. The elastomeric body 58 may be formed of a resilient natural rubber or a synthetic rubber compound. The mass element 56 may be formed of steel or another metal or metal alloy. The tuned mass damper assembly 54 has a mass that is calibrated to dampen vibrations and minimize resonant frequencies generated by the powertrain due to modal alignment. The tuned mass damper assembly 54 is directly bonded, molded, or pressed to the opening 52 in the second arm 22 of the pendulum mount 16.

Figure 11:
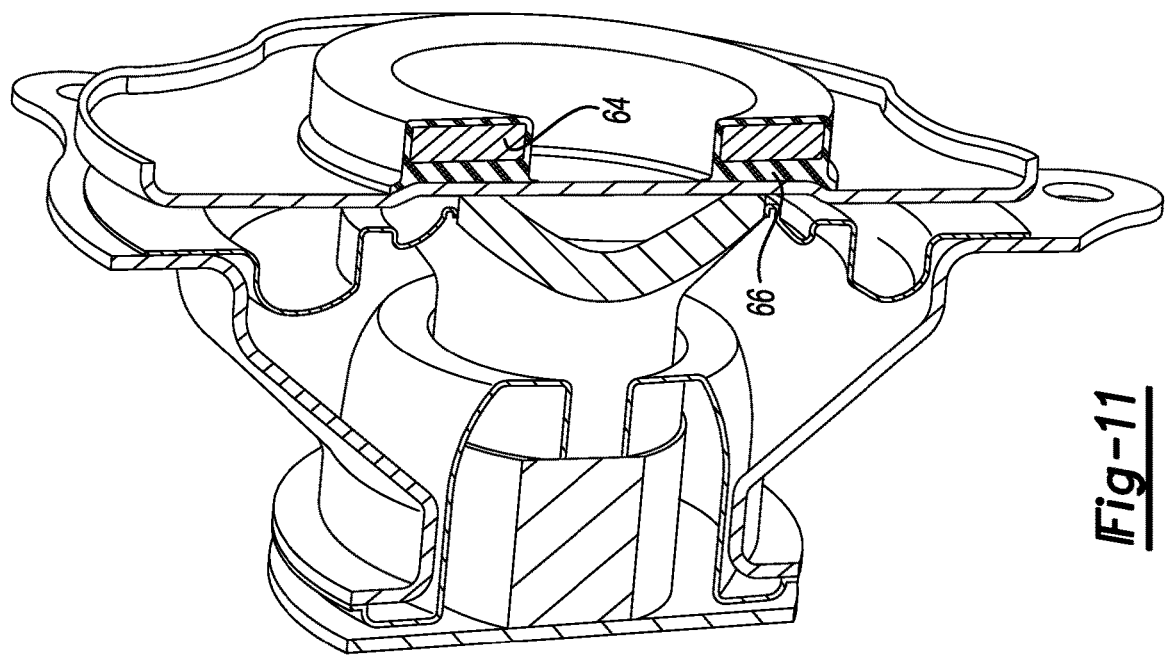
FIG. 11 is a cross-section view taken along the line 11-11 in FIG. 10.
Figure 10:
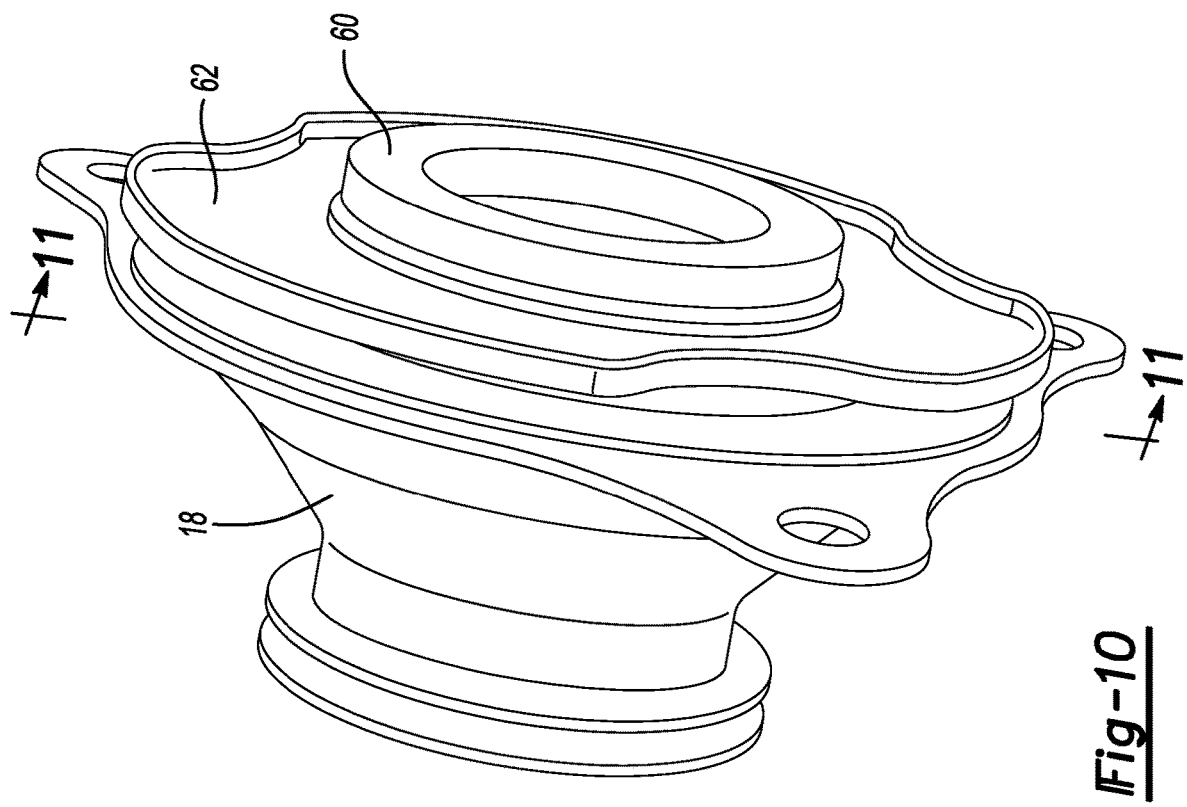
FIG. 10 is a perspective view of another embodiment of an e-machine mounting plate with a mass damper element integrally attached to the mounting plate with a molded elastomeric body.

Referring to FIGS. 10 and 11, a tuned mass damper assembly 60 is illustrated that is directly molded onto a snubbing plate 62 that is attached to a mounting structure of the main rubber element (MRE) 18 that is aligned with the central axis of the e-machine 12 (shown in FIG. 1). The tuned mass damper assembly 60 includes a mass element 64 and an elastomeric body 66. The elastomeric body 66 is molded around and encases the mass element 64 and is bonded to the snubbing plate 62.

The method of assembling the tuned mass damper assembly 60 to the snubbing plate 62 includes the steps of positioning the mass element 64 next to the snubbing plate 62 and concentric relative to the central axis of the motor retention element 18. The elastomeric body 66 is molded around and encases the mass element 64 and is bonded to the snubbing plate 62. The snubbing plate is then assembled to the MRE 18.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A tuned mass damper assembly for a drivetrain component attached to a vehicle frame comprising:
    a snubbing plate attached to a mounting plate of the drivetrain component;
    a molded elastomeric body; and
    a mass element being a solid metal body defining a hole, wherein the mass element is tuned to damp a predetermined vibration, and wherein the molded elastomeric body encases the mass element and fixedly attaches the mass element to the snubbing plate.

2. The tuned mass damper assembly of claim 1 wherein the elastomeric body attaches the mass element to the snubbing plate.

3. The tuned mass damper assembly of claim 1 wherein the drivetrain component is an e-machine, and the mount is a pendulum mount that attaches the e-machine to an overhanging crossbar attached to the vehicle frame.

4. The tuned mass damper assembly of claim 1 wherein the mount is an engine mount that is attached to the vehicle frame.

5. The tuned mass damper assembly of claim 1 wherein the molded elastomeric body is formed of rubber that encases the mass element.

* * * * *